United States Patent [19]

Tanaka et al.

[11] 4,425,258

[45] Jan. 10, 1984

[54] CATALYSTS FOR POLYMERIZATION OF OLEFINS

[75] Inventors: Hideyuki Tanaka; Kiyotaka Saito, both of Machida; Shozo Hori, Ayase; Yutaka Mitsuda, Tokyo, all of Japan

[73] Assignee: Denki Kagaku Kogyo Kabushiki Kaisha, Tokyo, Japan

[21] Appl. No.: 276,835

[22] Filed: Jun. 24, 1981

[51] Int. Cl.³ ............................ C08F 4/02; C08F 4/64
[52] U.S. Cl. .................................. 502/154; 526/125; 502/168.46
[58] Field of Search ..................................... 252/429 B

[56] References Cited

U.S. PATENT DOCUMENTS

| | | | |
|---|---|---|---|
| 3,758,621 | 9/1973 | Morikawa et al. | 252/429 B X |
| 3,907,705 | 9/1975 | Mertzweiller et al. | 252/429 B X |
| 3,953,414 | 4/1976 | Galli et al. | 252/429 B X |
| 4,085,276 | 4/1978 | Toyota et al. | 252/429 B X |
| 4,143,223 | 3/1979 | Toyota et al. | 252/429 B X |
| 4,149,990 | 4/1979 | Giannini et al. | 252/429 B |
| 4,154,915 | 5/1979 | Matsuura et al. | 252/429 B X |
| 4,156,063 | 5/1979 | Giannini et al. | 252/429 B X |
| 4,314,911 | 2/1982 | Giannini et al. | 252/429 B X |
| 4,325,838 | 4/1982 | Tanaka et al. | 252/429 B |
| 4,329,256 | 5/1982 | Rust et al. | 252/429 B |

*Primary Examiner*—Patrick Garvin
*Attorney, Agent, or Firm*—Bucknam and Archer

[57] ABSTRACT

A solid catalyst for olefin polymerization is obtained by treating magnesium halide with a sulfur compound or sulfur and a sulfur compound and further treating with an electron donor compound and a halogen-containing titanium compound. Alternatively, the magnesium halide is treated with halogen and/or an interhalogen compound and sulfur and/or a sulfur compound and is further treated with an electron donor compound and a halogen-containing titanium compound. The solid catalyst thus obtained is used for a catalytic system for olefin polymerization in combination with an organometallic compound.

5 Claims, No Drawings

CATALYSTS FOR POLYMERIZATION OF OLEFINS

BACKGROUND OF THE INVENTION

This invention relates to a catalytic component for polymerization of olefins and a catalytic system containing the same.

Various types of Ziegler-Natta catalyst are known as a catalyst for polymerization of olefins. By the use of these catalysts olefin polymers of stereospecificity are obtained, However, the yield of polymer per unit weight of the titanium catalytic component, i.e. the polymerization activity is still low and also, it is necessary to remove catalytic residues from the polymers thus obtained. For the purpose of eliminating these disadvantages there are provided a process of copulverizing titanium halide and a magnesium halide-electron donor compound adduct and a process of copulverizing magnesium halide and an electron donor compound and contacting the copulverized product with titanium halide (Japanese Patent Publication No. 52-39431 and Japanese Patent Kokai No. 52-151691). However, these processes are not yet satisfactory increasing in the polymerization activity and stereospecificity so that a considerable amount of amorphous polymers and catalytic residues is present in the olefin polymers obtained.

Also, it is known to use a product obtained by adding an electron donor compound and titanium halide to magnesium halide without mechanically pulverizing as a catalyst for olefin polymerization. This catalyst, however, has a low polymerization activity and is not intended for practical use.

SUMMARY OF THE INVENTION

An object of this invention is to provide a catalytic component for olefin polymerization and a catalytic system containing the same, which is superior in polymerization activity and stereospecificity to other known catalytic systems.

In accordance with this invention, there is provided a catalytic component for olefin polymerization which comprises treating magnesium halide as a substrate with a sulfur compound or sulfur and a sulfur compound and further treating with an electron donor compound and a halogen-containing titanium compound.

Alternatively, the magnesium halide is treated with halogen and/or an interhalogen compound and sulfur and/or a sulfur compound and is further treated with an electron donor compound and a halogen-containing titanium compound.

Also, in accordance with this invention there is provided a catalytic system for olefin polymerization comprising the above-mentioned catalytic component and an organometallic compound containing a metal of Groups 1, 2 or 3 of the Periodic Table.

DETAILED DESCRIPTION OF THE INVENTION

Magnesium halide which may be used as a substrate is selected from the group of $MgCl_2$, $MgBr_2$ and $MgI_2$.

Sulfur compounds for the treatment of magnesium halide are, preferably, sulfides, sulfur halides, sulfur oxyhalides, mercaptans and thioethers. Examples of sulfides are $MgS$, $CaS$, $ZnS$, $P_2S_5$, $P_4S_5$, $P_4S_3$, $Al_2S_3$, $B_2S_3$, $N_4S_4$, $N_2S_2$, $N_2S_4$, $SiS_2$ and $CS_2$. Examples of sulfur halides are $S_2Cl_2$, $SCl_2$ and $SI_6$. Examples of sulfur oxyhalides are $SOCl_2$, $SOCl_2$, $S_2O_5Cl_2$, $SOBr_2$ and $SOF_2$. Examples of mercaptans are methyl mercaptan, ethyl mercaptan, n-propyl mercaptan, iso-propyl mercaptan, n-octyl mercaptan, n-dodecyl mercaptan, t-dodecyl mercaptan, n-cetyl mercaptan, ethylenedimethyl mercaptan, tetramethylene dimercaptane and 1,3-dimercapto acetone. Examples of thioethers are dimethyl sulfide, methylethyl sulfide, allyl sulfide, dimethyl disulfide, diethyl disulfide, ethylisopropyl disulfide and ethyl-n-butyl disulfide. The sulfur compounds may also be used in mixture of two or more.

Also, as the treating agent, at least one member selected from the group of halogen and an interhalogen compound may be used in combination with at least one selected from the group of sulfur and a sulfur compound.

In the first group, halogen is, for example, $Cl_2$, $Br_2$ and $I_2$ and the interhalogen compound may be represented by the formula, $$XY_n$$

wherein X and Y are different halogen atoms and n is a number of 1, 3, 5 or 7, for example, ClF, BrF, IF, BrCl, ICl, IBr, $BrF_3$, $IF_3$, $ICl_3$, $BrF_5$, $IF_5$ and $IF_7$.

In the second group, sulfur includes various allotropes and as the sulfur compound there are exemplified the above-mentioned sulfides, sulfur halides, sulfur oxyhalides, mercaptans and thioethers. $K_2S_2O_8$ may be also used as the sulfur compound.

The magnesium halide treated with the above treating agent is then treated with an electron donor compound and a halogen-containing titanium compound.

The electron donor compound which may be used in this invention is a compound capable of forming a complex compound by reaction with a halogen-containing titanium compound. Examples of these compounds include amines, amides, ethers, esters, ketones, phosphines, phosphoramides, thioethers, thioesters, alcoholates, sulfoxides, sulfonates, sulfones, sulfinates and others.

In the light of the catalytic activity and stereospecificity the electron donor agent is preferably an, esters of an organic acid and more preferably an, aromatic carboxylic acid ester, examples of which are ethyl benzoate, ethyl o-chlorobenzoate, ethyl p-methoxybenzoate, ethyl p-ethoxybenzoate, toluic acid ethyl ester and isobutyl benzoate. The electron donor compound may be used in mixture of two or more. Particularly, aromatic esters such as ethyl benzoate, ethyl p-methoxybenzoate and ethyl α-naphthoate are preferred.

A halogen-containing titanium compound which may be used in this invention is, for example, $TiCl_4$, $TiBr_4$, $TiI_4$, $TiCl_3$, $TiBr_3$, $TiI_3$, $Ti(OCH_3)Cl_3$, $Ti(OCH_3)_2Cl_2$, $Ti(OC_2H_5)Cl_3$, $Ti(OC_2H_5)_2Cl_2$, $Ti(OC_3H_7)Cl_3$, $Ti(OC_3H_7)_2Cl_2$ and $Ti(OC_4H_9)Cl_3$. These compounds may be used alone or in mixture of two or more. Particularly, $TiCl_3$ and $TiCl_4$ are preferred.

Next, the procedure for preparing the catalyst from the above-mentioned components is explained in detail.

First, magnesium halide is treated in, for example, the following manner:

(i) Mixtures or adducts of magnesium halide with the treating agent are pulverized in the presence or in the absence of an inert gas by means of a ball mill, a rod mill, a vibration mill or impact mill. $SiCl_4$, $CCl_4$, 1,2-dichloroethane, hexane or toluene may be added for assisting the pulverization;

(ii) A powdery magnesium halide which has been preliminarily pulverized and the treating agent or a magnesium halide-treating agent adduct is treated in a solvent such as hexane, heptane, carbon tetrachloride, 1,2-dichloroethane and toluene; or (iii) A powdery magnesium halide is contacted with the treating agent in vapour phase.

In case of procedure (iii) the treating agent should be one vaporizing at temperatures below 500° C.

Magnesium halide may be treated with two or more treating agents in accordance with any one of procedures (i) to (iii), or any one of the procedures may be repeated two or more times with the same or different treating agents, or the treating may be carried out in two or more combinations of the procedures (i), (ii) or (iii) with the treating agent. The mole ratio of magnesium halide to the treating agent is within the range of 1:0.01-5, preferably 1:0.05-1. Preferably, the treating time is comprised between 3 minutes and 300 hours and the temperature between −78° and 500° C.

The magnesium halide thus treated may be used in the next step i.e. treatment steps with an electron donor compound and a halogen-containing titanium compound. If desired, an excess of the treating agent is removed by washing with an inert solvent such as hexane, heptane, carbon tetrachloride, 1,2-dichloroethane and toluene or vapourizing under reduced pressure.

The treated magnesium halide is subject to the treatment with electron donor compound followed by the treatment with halogen-containing titanium compound whereby the desired catalytic component is obtained. Alternatively, after having conducted the titanium compound treatment the electron donor compound treatment may be effected, or the electron donor compound treatment may be effected simultaneously with the titanium compound treatment. The electron donor compound treatment is usually effected in an inert solvent such as hexane, heptane, kerosene, cyclohexane, benzene, toluene, carbon tetrachloride and 1,2-dichloroethane. The inert solvent is used in an arbitrary amount for the purpose of assisting diffusion of the electron donor compound. The amount of the electron donor compound used is within the range of 0.1-2000 millimols, preferably 0.5-700 millimols based on 1.0 gram atom of Mg of magnesium halide. The treatment time of 3 minutes to 300 hours and the temperature of −20° to 150° C. are preferred.

The magnesium halide treated with the electron donor compound is used in the treatment step with a halogen-containing titanium compound. If desired, an excess of the electron donor compound may be removed by washing with an inert solvent such as mentioned above or vapourizing under reduced pressure. The titanium compound treatment may be carried out in vapour phase or liquid phase. The halogen-containing titanium compound, in case of liquid, is used as it is or in mixture with an arbitrary amount of an inert solvent and in case of solid, is used by adding an electron donor compound, halogen or an interhalogen compound and dissolving in an organic solvent such as 1,2-dichloroethane, i-amylether, hexane and toluene. The amount of the titanium compound used may be within the range of 0.1 milligram atom—30 gram atoms based on 1.0 gram atom of Mg of magnesium halide. The treatment time is between 3 minutes and 300 hours, and the treatment temperature is within the range of −20° to 200° C., preferably 20° to 130° C. After the treatment at the halogen-containing titanium compound or complex compounds thereof, if desired, are removed by washing with an inert solvent.

The solid catalyst thus obtained is a catalyst for olefin polymerization of this invention, in which the titanium content is within the range of 0.05-12% by weight, preferably 0.1-8% by weight and more preferably, 1-5% by weight.

A catalytic system for olefin polymerization is obtained by combining the solid catalytic component of this invention with an organometallic compound containing a metal of Groups 1, 2 or 3 of the Periodic Table. The organometallic compound is, for example, compounds having the formula, $M_1AlR_1R_2R_3R_4$, $M_2(AlR_1R_2R_3R_4)_2$ or $(AlR_1R_2R_3)_n \cdot (MgR_1R_2)_m$ wherein $M_1$ is an alkali metal, $M_2$ is an alkaline earth metal, $R_1$ is an aryl group, alkyl group or alcoholate having 1-10 carbon atoms, $R_2$, $R_3$ and $R_4$ each is hydrogen atom, a halogen atom or an aryl group, alkyl group or alcoholate group having 1-10 carbon atoms, and n and m are a number such that the m/n ratio is about 0.2-8, for example, $Li[Al(CH_3)_3H]$, $Li[Al(OCH_3)(CH_3)_3]$, $Li[Al(CH_3)_4]$, $Li[Al(C_2H_5)_3H]$, $Li]Al(OC_2H_5)(C_2H_5)_3]$, $Li[Al(C_2H_5)_4]$, $Na[Al(CH_3)_3H]$, $Na[Al(OCH_3)(CH_3)_3]$, $Na[Al(CH_3)_4]$, $Na[Al(C_2H_5)_3H]$, $Na[Al(C_2H_5)_2ClH]$, $Na[Al(C_2H_5)_3Cl]$, $Na[Al(OC_2H_5)(C_2H_5)_3]$, $Na[Al(C_2H_5)_4]$, $Na[Al(C_3H_7)_3H]$, $Na[Al(C_3H_7)_2ClH]$, $Na[Al(C_3H_7)_3Cl]$, $Na[Al(OC_3H_7)(C_3H_7)_3]$, $Na[Al(C_3H_7)_4]$, $Na[Al(C_4H_9)_3H]$, $Na[Al(C_4H_9)_2ClH]$, $Na[Al(C_4H_9)_3Cl]$, $Na[Al(OC_4H_9)(C_4H_9)_3]$, $Na[Al(C_4H_9)_4]$, $K[Al(CH_3)_3H]$, $K[Al(CH_3)_3Cl]$, $K[Al(OCH_3)(CH_3)_3]$, $K[Al(CH_3)_4]$, $K[Al(C_2H_5)_3H]$, $K[Al(C_2H_5)_2H_2]$, $K[Al(C_2H_5)_3Cl]$, $K[Al(OC_2H_5)(C_2H_5)_3]$, $K[Al(C_2H_5)_4]$, $K[Al(C_3H_7)_4]$, $K[Al(C_4H_9)_3H]$, $K[Al(C_4H_9)_3Cl]$, $K[Al(OC_4H_9)(C_4H_9)_3]$, $K[Al(C_4H_9)_4]$, $Mg[Al(C_2H_5)_3H]_2$, $Mg[Al(C_2H_5)_2ClH]_2$, $Mg[Al(C_2H_5)_3Cl]_2$, $Mg[Al(C_2H_5)_4]_2$, $Ca[Al(C_2H_5)_3H]_2$, $Ca[Al(C_2H_5)_3Cl]_2$, $Ca[Al(C_2H_5)_4]_2$, $Sr[Al(C_2H_5)_3H]_2$, $Sr[Al(C_2H_5)_3Cl]_2$, $Sr[Al(C_2H_5)_4]_2$, $Ba[Al(C_2H_5)_3H]_2$, $Ba[Al(C_2H_5)_3Cl]_2$ and $Ba[Al(C_2H_5)_4]_2$: alkyl aluminum compounds, for example, trialkyl aluminum, alkyl aluminum alkoxides, alkyl aluminum halides and alkyl aluminum alkoxyhalides; alkyl zinc compounds, for example, dialkyl zinc; alkyl magnesium compounds. The organometallic compound may be used alone or in mixture of two or more. Further, the organometallic compound may be used in combination with an electron donor compound wherein a complex compound is partially or wholly formed. Also, such a complex compound may be used in mixture with the organometalic compound at the time of polymerization. An amount of the organometallic compound used is within the range of 0.01-500 mols, preferably 0.5-150 mols based on 1 mol of titanium atom of the solid catalyst. The solid catalyst and the organometallic compound may be added simultaneously or separately. Also, the addition may be conducted at once, divided in parts or continuously.

Olefins which are polymerized using the catalyst of this invention are, for example, ethylene, propylene, 1-butene, 1-pentene, 1-hexen and 4-methyl-pentene. Homopolymerization of these monomers or random or block copolymerization of monomers of two or more can be carried out. Also, other polymerizable compounds may be used as the copolymerizable monomer.

The polymerization may be carried out in vapour phase or in liquid phase in which are inert solvent such as hexane, heptane and kerosene is used as a reaction medium or olefin monomers themselves may be used as the medium. The molecular weight of polyolefin is controlled by, for example, hydrogen. The polymerization temperature is not particularly limited, though it is between 0° and 150° C., preferably 40° and 80° C. The polymerization pressure is, preferably between 1 and 50 kg/cm$^2$, but not particularly limited. The polymerization may be effected under batch, semi-continuous or continuous system in one step having the same polymerization conditions or divided in steps of two or more having different polymerization conditions.

This invention will be illustrated by the following non-limitative examples.

EXAMPLE 1

Preparation of Solid Catalyst 45 g of a commercially available anhydrous magnesium chloride and 5 g of $S_2Cl_2$ were charged to and sealed up in a stainless steel ball mill pot of 2.5 l in capacity and 145 mm in inside diameter containing 400 balls of stainless steel having a diameter of 15.9 mm under a nitrogen gas atmosphere, and pulverized at room temperature under 88 rpm for 72 hours. 17 g of the solid obtained were dispersed in 80 ml of a refined n-heptane and 7 ml of ethyl benzoate were added over about 5 minutes while stirring. Thereafter the inner temperature was raised to 80° C. and stirring was effected for 90 minutes. Next, the dispersion was filtered and the resulting solid was washed three times with 50 ml of hot n-heptane. The solid obtained was dispersed in 300 ml of $TiCl_4$, the temperature was raised to 80° C., and stirring was effected for 120 minutes. The product thus treated was filtered while still hot and the resulting solid was washed four times with 50 ml of heptane and then, dried under reduced pressure at about 60° C. for 60 minutes. The solid catalyst thus obtained had a titanium content of 1.77% by weight as metal titanium.

Polymerization 1500 ml of a dried, refined n-heptane, 0.50 millimols of $Na[Al(C_2H_5)_4]$ and 540 mg of the powdery solid catalyst were charged under a nitrogen gas stream into a 3.0 l stainless steel autoclave which had been dried sufficiently and purged by gaseous nitrogen and the inner temperature was raised to 55° C. Propylene was introduced till the internal pressure of 4 kg/cm$^2$ while the inner temperature was maintained at 55° C., and polymerization was carried out during the indicated time. 30 ml of iso-propanol were added, the temperature was reduced to room temperature and the remaining propylene was removed. The contents of the autoclave were filtered off and dried under reduced pressure at 60° C. Thus 522 g of a white powdery polypropylene were obtained. On the other hand, the filtrate contained 6 g of a n-heptane soluble polymer.

A residue rate of extraction of powdery polypropylene by a boiling n-heptane is referred to as "Powdery Polymer II". An intrinsic viscosity of the polymer (135° C., in Tetraline) was 3.67.

REFERENCE EXAMPLE 1

Pulverization was carried out for 72 hours in the same manner as in Example 1 except that 52 g of anhydrous magnesium chloride only was charged instead of magnesium chloride and $S_2Cl_2$. Using 17 g of the pulverized product, a solid catalyst was obtained in the same manner as in Example 1. The Ti content in the solid catalyst was 1.50% by weight. Using this catalyst component with $Na[Al(C_2H_5)_4]$, polymerization was carried out in the same manner as in Example 1.

EXAMPLES 2–7

Solid catalysts were obtained in the same manner as in Example 1 except that various treating agents were used instead of $S_2Cl_2$. Using these solid catalysts with $Na[Al(C_2H_5)_4]$, polymerization of propylene was carried out in the same procedure as in Example 1.

EXAMPLES 8–9

A solid catalyst was obtained in the same manner as in Example 1 except using 6 g of $S_2Cl_2$. The Ti content in the solid catalyst was 2.35% by weight. Using the solid catalyst with an organometallic compound and an additive as indicated in Table 1, polymerization of propylene was carried out in the same procedure as in Example 1.

REFERENCE EXAMPLE 2

Using the solid catalyst of Reference Example 1, $Al(C_2H_5)_3$ and ethyl benzoate, polymerization of propylene was carried out in the same procedure as in Example 9.

EXAMPLE 10

A solid catalyst was obtained in the same manner as in Example 1 except that as the treating agent $SOCl_2$ and n-dodecyl mercaptan were used instead of $S_2Cl_2$. The Ti content in the solid catalyst was 2.71% by weight. Using this solid catalyst with $Na[Al(C_2H_5)_4]$, polymerization of propylene was carried out in the same procedure as in Example 1.

EXAMPLE 11

50 mg of the solid catalyst of Example 2, 1.0 millimol of $Al(C_2H_5)_3$ and 1200 ml of a dried refined n-heptane were charged into a 3.0 l stainless steel autoclave and the temperature was raised to 55° C. Then, hydrogen was fed till the inner pressure of 3 kg/cm$^2$ and immediately, ethylene was fed, which was polymerized at 55° C. under the total pressure of 7 kg/cm$^2$ for two hours.

TABLE 1

| Ex. No. | Treating Agents | A-mount (g) | Ti Content (%) | A-mount of Cat. (mg) | Org. metallic compds. | A-mount (m mol) | Additives (m mol) | Polymn. Time (Hr) | Yield of Polymer (g) | KA* | Powdery Polymer II (%) | Total Polymer II (%) |
|---|---|---|---|---|---|---|---|---|---|---|---|---|
| 1 | $S_2Cl_2$ | 5 | 1.77 | 540 | $Na[Al(C_2H_5)_4]$ | 0.5 | — | 2 | 528 | 6880 | 97.2 | 96.1 |
| 2 | $SOCl_2$ | 7 | 2.08 | 460 | " | 0.5 | — | 1.5 | 526 | 9140 | 96.1 | 94.3 |
| 3 | $SO_2Cl_2$ | 7 | 2.16 | 440 | " | 0.5 | — | 2 | 529 | 6900 | 94.8 | 93.1 |
| 4 | $B_2S_3$ | 5 | 5.49 | 170 | " | 0.7 | — | 2 | 598 | 7800 | 93.2 | 91.4 |

TABLE 1-continued

| Ex. No. | Treating Agents | A-mount (g) | Ti Content (%) | A-mount of Cat. (mg) | Org. metallic compds. | A-mount (m mol) | Additives (m mol) | Polymn. Time (Hr) | Yield of Polymer (g) | KA* | Powdery Polymer II (%) | Total Polymer II (%) |
|---|---|---|---|---|---|---|---|---|---|---|---|---|
| 5 | MgS | 5 | 1.99 | 480 | " | 1.0 | — | 1.5 | 548 | 9540 | 96.1 | 93.3 |
| 6 | n-Dodecyl-mercaptan | 5 | 1.83 | 520 | " | 0.6 | — | 1.7 | 541 | 8310 | 97.1 | 95.4 |
| 7 | Ethyl-n-butyl disulfide | 5 | 2.40 | 400 | " | 0.6 | — | 2 | 610 | 7960 | 96.9 | 95.0 |
| 8 | $S_2Cl_2$ | 6 | 2.35 | 410 | $Ca[Al(C_2H_5)_4]_2$ | 1.0 | — | 2 | 589 | 7680 | 97.5 | 95.8 |
| 9 | " | 6 | 2.35 | 410 | $Al(C_2H_5)_3$ | 17 | Ethyl benzoate 6 | 1.7 | 530 | 8140 | 95.4 | 93.3 |
| 10 | $SOCl_2$ n-Dodecyl-mercaptane | 3 3 | 2.71 | 350 | $Na[Al(C_2H_5)_4]$ | 0.5 | — | 1.5 | 512 | 8900 | 96.7 | 94.7 |
| 11 | $SOCl_2$ | 7 | 2.08 | 50 | $Al(C_2H_5)_3$ | 1.0 | — | 2 | 364 | 43700 | — | — |
| Ref. Ex. | | | | | | | | | | | | |
| 1 | — | | 1.50 | 640 | $Na[Al(C_2H_5)_4]$ | 0.5 | — | 2 | 39 | 510 | 87.6 | 81.2 |
| 2 | — | | 1.50 | 640 | $Al(C_2H_5)_3$ | 17 | Ethyl benzoate 6 | 2 | 41 | 530 | 89.2 | 85.1 |

*Average polymerization activity indicated by polymer g/g.Ti.hr kg/cm$^2$

EXAMPLE 12

Preparation of Solid Catalyst 45 g of anhydrous magnesium chloride, 7 g of ICl and 2 g of sulfur were charged into and sealed up in a stainless steel ball mill pot of 2.5 l in capacity and 145 mm in inner diameter containing 400 balls of stainless steel having a diameter of 15.9 mm under a nitrogen gas atmosphere, and pulverized at room temperature under 88 rpm for 72 hours. 17 g of the solid obtained were dispersed in 80 ml of a refined n-heptane and 7 ml of ethyl benzoate were added over about 5 minutes while stirring. Thereafter the inner temperature was raised to 80° C. and stirring was effected for 90 minutes. Next, the dispersion was filtered and the resulting solid was washed three times with 50 ml of hot n-heptane. The solid obtained was dispersed in 300 ml of TiCl$_4$, the temperature was raised to 80° C., and stirring was effected for 120 minutes. The product thus treated was filtered while still hot and the resulting solid was washed four times with 50 ml of heptane and then, dried under reduced pressure at about 60° C. for 60 minutes. The solid catalyst thus obtained had a titanium content of 3.38% by weight as metal titanium.

Polymerization 1500 ml of a dried, refined n-heptane, 0.38 millimols of Na[Al(C$_2$H$_5$)$_4$] and 210 mg of the powdery solid catalyst were changed under a nitrogen gas stream into a 3.0 l stainless steel autoclave which had been dried sufficiently and purged by gaseous nitrogen and the inner temperature was elevated to 55° C. Propylene was introduced till the internal pressure of 4 kg/cm$^2$ while the internal temperature was maintained at 55° C., and polymerization was carried out during indicated time. 30 ml of iso-propanol were added, the temperature was reduced to room temperature and the remaining propylene was removed. The contents of the autoclave were filtered off and dried under reduced pressure at 60° C. Thus 521 g of a white powdery polypropylene were obtained. On the other hand, the filtrate contained 9 g of a n-heptane soluble polymer. The intrinsic viscosity of the polymer (135° C., in Tetraline) was 4.01.

REFERENCE EXAMPLE 3

Pulverization was carried out for 72 hours in the same manner as in Example 12 except using 52 g of anhydrous mangesium chloride only instead of magnesium chloride, ICl and sulfur. Using 17 g of this pulverization product, a solid catalyst was obtained in the same manner as in Example 12. The Ti content in this solid catalyst was 1.50% by weight. Using the solid catalyst with Na[Al(CH$_2$H$_5$)$_4$], polymerization of propylene was carried out by the same procedure as in Example 12.

EXAMPLES 13–22

Solid catalysts were obtained in the same manner as in Example 12 except that various treating agents were used instead of ICl and sulfur. Using the solid catalyst with Na[Al(C$_2$H$_5$)$_4$], polymerization of propylene was carried out in the same manner as in Example 12.

REFERENCE EXAMPLES 4 TO 5

The process of Example 12 was repeated except the treating agent. The use of halogen or interhalogen compound only as the treating agent results in lowering of the polymerization activity and stereospecificity.

EXAMPLE 23

30 mg of the solid catalyst of Example 13, 1.0 millimol of Al(C$_2$H$_5$)$_3$ and 1200 ml of a dried, refined n-heptane were charged to a 3.0 l stainless steel autoclave and temperature was elevated to 55° C. Then, hydrogen was fed till the internal pressure of 3 kg/cm$^2$ and immediately, ethylene was fed and polymerized at 55° C. under pressure of 7 kg/cm$^2$ for two hours.

EXAMPLE 24

45 g of anhydrous magnesium chloride were fed to the ball mill pot used in Example 12 and pulverized for 96 hours. 16 g of the powdery magnesium chloride were dispersed in 80 ml of a refined n-heptane, 7 g of ICl and 2 g of sulfur were added, temperature was elevated to 80° C. and stirring was effected for two hours. After the treatment, 6 ml of ethyl benzoate were added and stirred at 80° C. for 90 minutes. In the same manner as in the preparation of the catalytic component in Example 12, the solid was washed three times with 50 ml of hot n-heptane and subjected to the treatment with titanium tetrachloride, washing and drying to obtain a solid catalytic component.

Ti content of the solid catalytic component: 2.38%

Using this solid catalytic component with Na-[Al(C$_2$H$_5$)$_4$], polymerization of propylene was carried out in the same manner as in Example 12.

TABLE 2

| Ex. No. | Treating Agents | Amount (g) | Ti Content (%) | Amount of Cat. (mg) | Org. metallic compds. | Amount (m mol) | Polymn. Time (Hr) | Yield of Polymer (g) | KA | Powdery Polymer II (%) | Total Polymer II (%) |
|---|---|---|---|---|---|---|---|---|---|---|---|
| 12 | ICl(7) + S(2) | | 3.38 | 210 | Na[Al(C$_2$H$_5$)$_4$] | 0.38 | 1.7 | 521 | 10800 | 96.8 | 95.1 |
| 13 | ICl(5) + S(1) | | 2.50 | 290 | " | " | 2 | 579 | 9980 | 97.1 | 96.3 |
| 14 | I$_2$(5) + S(1) | | 2.75 | 260 | " | " | 1.5 | 536 | 12500 | 94.4 | 93.6 |
| 15 | IBr(5) + S(1) | | 2.57 | 280 | " | " | 1.5 | 484 | 11200 | 96.3 | 92.5 |
| 16 | I$_2$(5) + SOCl$_2$(3) | | 2.85 | 250 | " | " | 1.7 | 509 | 10500 | 96.8 | 95.6 |
| 17 | I$_2$(5) + SO$_2$Cl$_2$(3) | | 1.71 | 420 | " | " | 1.5 | 539 | 12500 | 97.3 | 96.3 |
| 18 | ICl(5) + SOCl$_2$(3) | | 1.85 | 390 | " | " | 1.5 | 619 | 14300 | 97.8 | 96.9 |
| 19 | I$_2$(5) + SOCl$_2$(4) | | 3.16 | 230 | " | " | 1.5 | 475 | 10900 | 96.0 | 94.7 |
| 20 | ICl(7) + K$_2$(SO$_4$)$_2$(3) | | 2.68 | 270 | " | " | 2 | 599 | 10350 | 95.0 | 92.0 |
| 21 | SOCl$_2$(5) + S(1.5) | | 2.13 | 340 | " | " | 1.5 | 517 | 11900 | 97.0 | 96.4 |
| 22 | ICl(5) + SOCl$_2$(3) + S(1) | | 1.96 | 380 | " | " | 1.5 | 652 | 14600 | 97.5 | 96.8 |
| 23 | ICl(7) + S(1) | | 2.50 | 30 | Al(C$_2$H$_5$)$_3$ | 1.0 | 2 | 255 | 42500 | — | — |
| 24 | ICl(7) + S(2) | | 2.38 | 310 | Na[Al(C$_2$H$_5$)$_4$] | 0.38 | 2 | 480 | 8150 | 94.9 | 93.0 |
| Ref. Ex. | | | | | | | | | | | |
| 3 | — | | 1.50 | 480 | Na[Al(C$_2$H$_5$)$_4$] | 0.38 | 2 | 27 | 470 | 87.0 | 82.2 |
| 4 | ICl(6) | | 3.84 | 190 | " | " | 2 | 327 | 5600 | 95.2 | 94.1 |
| 5 | ICl(6) | | 3.70 | 190 | " | " | 2 | 242 | 4300 | 96.5 | 94.1 |

What is claimed is:

1. A catalytic component for polymerization of olefins having a titanium content of 0.05–12% by weight which is prepared by intimately contacting an anhydrous magnesium halide as a substrate with at least one of a sulfur compound or sulfur and a sulfur compound wherein said sulfur compound is a member selected from the group consisting of sulfides, sulfur halides, sulfur oxyhalides, mercaptans and thioethers, and further contacting with an electron donor compound and a halogen-containing titanium compound in which halogen is directly attached to titanium.

2. A catalytic component for polymerization of olefins having a titanium content of 0.05–12% by weight which is prepared by intimately contacting a magnesium halide as a substrate with halogen and/or an interhalogen compound and at least one of sulfur and/or a sulfur compound wherein said sulfur compound is a member selected from the group consisting of sulfides, sulfur halides, sulfur oxyhalides, mercaptans and thioethers, and further treating with an electron donor compound and a halogen-containing titanium compound in which halogen is directly attached to titanium.

3. The catalytic component according to claim 1 or 2 wherein the magnesium halide is selected from the group og MgCl$_2$, MgBr$_2$ and MgI$_2$.

4. The catalytic component of claim 2 wherein said interhalogen compound is represented by the formula, $$XY_n$$

wherein X and Y are different halogen atoms and n is 1, 3, 5 or 7.

5. A catalytic system for polymerization of olefins which comprises the catalytic component of claims 1 or 2 and an organometallic compound containing a metal of Groups 1, 2 or 3 of the Periodic Table.

* * * * *